United States Patent
Brouwer et al.

(10) Patent No.: US 10,169,068 B2
(45) Date of Patent: *Jan. 1, 2019

(54) LIVE MIGRATION FOR VIRTUAL COMPUTING RESOURCES UTILIZING NETWORK-BASED STORAGE

(71) Applicant: Amazon Technologies, Inc., Seattle, WA (US)

(72) Inventors: Pieter Kristian Brouwer, Issaquah, WA (US); Kristina Kraemer Brenneman, Bellevue, WA (US); Marc John Brooker, Seattle, WA (US); Jerry Lin, Seattle, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,030

(22) Filed: Mar. 9, 2017

(65) Prior Publication Data
US 2017/0177401 A1 Jun. 22, 2017

Related U.S. Application Data

(63) Continuation of application No. 14/738,439, filed on Jun. 12, 2015, now Pat. No. 9,594,598.

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 9/5088* (2013.01);
(Continued)

(58) Field of Classification Search
CPC .................................................. G06F 9/45558
(Continued)

(56) References Cited

U.S. PATENT DOCUMENTS 6,842,898 B1 * 1/2005 Carlson ............... G06F 11/0715
714/E11.003
6,934,945 B1 8/2005 Ogilvy
(Continued)

OTHER PUBLICATIONS

Win et al, "Virtual Machine Introspection", ACM, pp. 1-6, 2014.*
(Continued)

*Primary Examiner* — Anil Khatri
(74) *Attorney, Agent, or Firm* — Robert C. Kowert; Meyertons, Hood, Kivlin, Kowert & Goetzel, P.C.

(57) ABSTRACT

Live migration may be performed for virtual computing resources utilizing network-based storage. A virtual compute instance operating at a source host may be moved to a destination host. The virtual compute instance may be a client of a network-based storage resource that stores data for the virtual compute instance. Access to the data stored for the virtual compute instance may be limited to the source host. When migration is performed, the destination host may be prepared to assume operation of the virtual compute instance. Operation of the virtual compute instance at the source host may be paused and the access to the data at the network-based storage resource may be modified to limit access to the destination host. Operation of the virtual compute instance may then resume at the destination host.

20 Claims, 13 Drawing Sheets

(52) U.S. Cl.
CPC ............... *G06F 2009/4557* (2013.01); *G06F 2009/45575* (2013.01); *G06F 2009/45595* (2013.01)

(58) Field of Classification Search
USPC ............................................. 718/1, 100–105
See application file for complete search history.

(56) References Cited

U.S. PATENT DOCUMENTS

| | | | |
|---|---|---|---|
| 7,278,142 B2 | 10/2007 | Bandhole et al. | |
| 7,383,405 B2 | 6/2008 | Vega et al. | |
| 7,424,710 B1 | 9/2008 | Nelson et al. | |
| 7,484,208 B1 | 1/2009 | Nelson | |
| 7,603,670 B1 | 10/2009 | van Rietschote | |
| 7,620,955 B1 | 11/2009 | Nelson | |
| 7,761,573 B2 | 7/2010 | Travostino et al. | |
| 7,900,005 B2 | 3/2011 | Kotsovinos et al. | |
| 8,141,075 B1* | 3/2012 | Chawla | G06F 9/45558 718/1 |
| 8,191,069 B2* | 5/2012 | Watanabe | G06F 11/0712 718/1 |
| 8,230,069 B2 | 7/2012 | Korupolu | |
| 8,261,265 B2 | 9/2012 | Chen et al. | |
| 8,286,174 B1 | 10/2012 | Schmidt et al. | |
| 8,407,518 B2* | 3/2013 | Nelson | G06F 11/203 714/13 |
| 8,489,699 B2 | 7/2013 | Goggin et al. | |
| 8,554,981 B2* | 10/2013 | Schmidt | G06F 11/203 711/6 |
| 8,555,274 B1* | 10/2013 | Chawla | G06F 9/5077 718/1 |
| 8,578,385 B2 | 11/2013 | Kinsey et al. | |
| 8,706,991 B2 | 4/2014 | Colbert et al. | |
| 8,776,050 B2 | 7/2014 | Plouffe et al. | |
| 8,782,637 B2* | 7/2014 | Khalid | G06F 8/61 718/1 |
| 8,806,482 B1 | 8/2014 | Nagargadde et al. | |
| 8,839,242 B2* | 9/2014 | Nakajima | H04L 29/12254 709/226 |
| 8,869,139 B2* | 10/2014 | Le | G06F 17/30067 717/174 |
| 8,909,767 B2* | 12/2014 | Sunkara | G06F 9/5072 709/224 |
| 8,918,785 B1 | 12/2014 | Brandwine et al. | |
| 8,924,969 B2* | 12/2014 | Khutornenko | G06F 9/45533 718/1 |
| 8,954,964 B2 | 2/2015 | Weinstein et al. | |
| 8,966,315 B2 | 2/2015 | Burn et al. | |
| 8,966,495 B2 | 2/2015 | Kulkarni | |
| 9,009,217 B1 | 4/2015 | Nagargadde et al. | |
| 9,201,677 B2* | 12/2015 | Joshi | G06F 9/45558 |
| 9,229,850 B1* | 1/2016 | Wang | G06F 9/5016 |
| 9,317,326 B2* | 4/2016 | Ramanathan | G06F 9/45533 |
| 9,594,598 B1 | 3/2017 | Brouwer et al. | |
| 9,852,011 B1* | 12/2017 | Yemini | G06F 9/5083 |
| 9,910,689 B2* | 3/2018 | Nair | G06F 13/28 |
| 2010/0082922 A1 | 4/2010 | George et al. | |
| 2011/0320556 A1 | 12/2011 | Reuther | |
| 2012/0013709 A1 | 1/2012 | Nishio | |
| 2012/0284471 A1 | 11/2012 | Hur et al. | |

OTHER PUBLICATIONS

Svard et al, "Principles and Performance Characteristics of Algorithms for Live VM Migration ", ACM, pp. 142-155, 2015.*
Hossain et al, "Partial Information Relaying with Multiple Relays and Destination Nodes", ACM, pp. 1-5, 2011 (Year: 2011).*
Ahmad-Kassem et al, "Messages with Implicit Destinations as Mobile Agents", ACM, pp. 107-118 (Year: 2012).*
Duval et al, "A Migration Mechanism to Manage Network Troubles while Interacting within Collaborative Virtual Environments", ACM, pp. 417-420, 2006 (Year: 2006).*
Wang et al, "A Distributed Control Framework for Performance Management of Virtualized Computing Environments", ACM, pp. 89-98, 2010 (Year: 2010).*
"Time-Constrained Live VM Migration in Share-Nothing IaaS-Clouds", Konstantions Tsakalozos, Vasilis Verroios, Mema Roussopoulos, Alex Delis, 2014 IEEE 7th International Conference on Cloud Computing, p. 56-63, 2014.
Song et al, "Can VoD Streaming Service Co-Exist with Other Services on a VM-based Virtualized Computing Platform?", ACM,pp. 95-103, 2007.
Butler et al, "CPVM: Customizable Portable Virtual Machines", ACM, pp. 616-619, 2006.
Grit et al, "Weighted Fair Sharing for Dynamic Virtual Clusters", ACM, pp. 461-462, 2008.
Goldberg, "Architecture of Virtual Machines", ACM, pp. 74-112, 1973.
Kim et al, "Task-aware Virtual Machine Scheduling for 1/0 Performance", ACM, pp. 101-110, 2009.
Masrur et al, "Designing VM Schedulers for Embedded Real-Time Applications", ACM, pp. 29-38, 2011.

* cited by examiner ized computing resources on demand. Consumers of virtu-
LIVE MIGRATION FOR VIRTUAL COMPUTING RESOURCES UTILIZING NETWORK-BASED STORAGE This application is a continuation of U.S. patent application Ser. No. 14/738,439, filed Jun. 12, 2015, now U.S. Pat. No. 9,594,598, which is hereby incorporated by reference herein in its entirety.

BACKGROUND

Virtualization technologies have driven rapid growth in virtual or "cloud-based" systems, which may provide various public (or private) functions and services. provider networks offer customers the opportunity to utilize virtualized computing resources on demand. Consumers of virtualized computing resources and storage, such as those offered by provider networks, can flexibly structure their computing and storage costs in response to immediately perceived computing and storage needs. For instance, virtualization allows customers of a provider network to purchase processor cycles and storage at the time of demand, rather than buying or leasing fixed hardware in provisioning cycles that are dictated by the delays and costs of manufacture and deployment of hardware. This lessens the need to accurately predict future demand as customers are able to purchase the use of computing and storage resources on a relatively instantaneous as-needed basis.

Virtualized computing resources also provide flexibility to provider networks. Resource utilization, capacity, planning, and other management activities performed as part of offering virtualized computing resources may rely upon the ability to choose appropriate physical resources to host virtualized computing resources and to launch or migrate virtualized resources to more efficient hosting locations. Moreover, the ability to launch or migrate resources in efficient locations may allow provider networks to better meet or exceed service level guarantees made to customers. Thus, efficient management of virtualized computing resources benefits both customers and provider networks.

Figure 1:
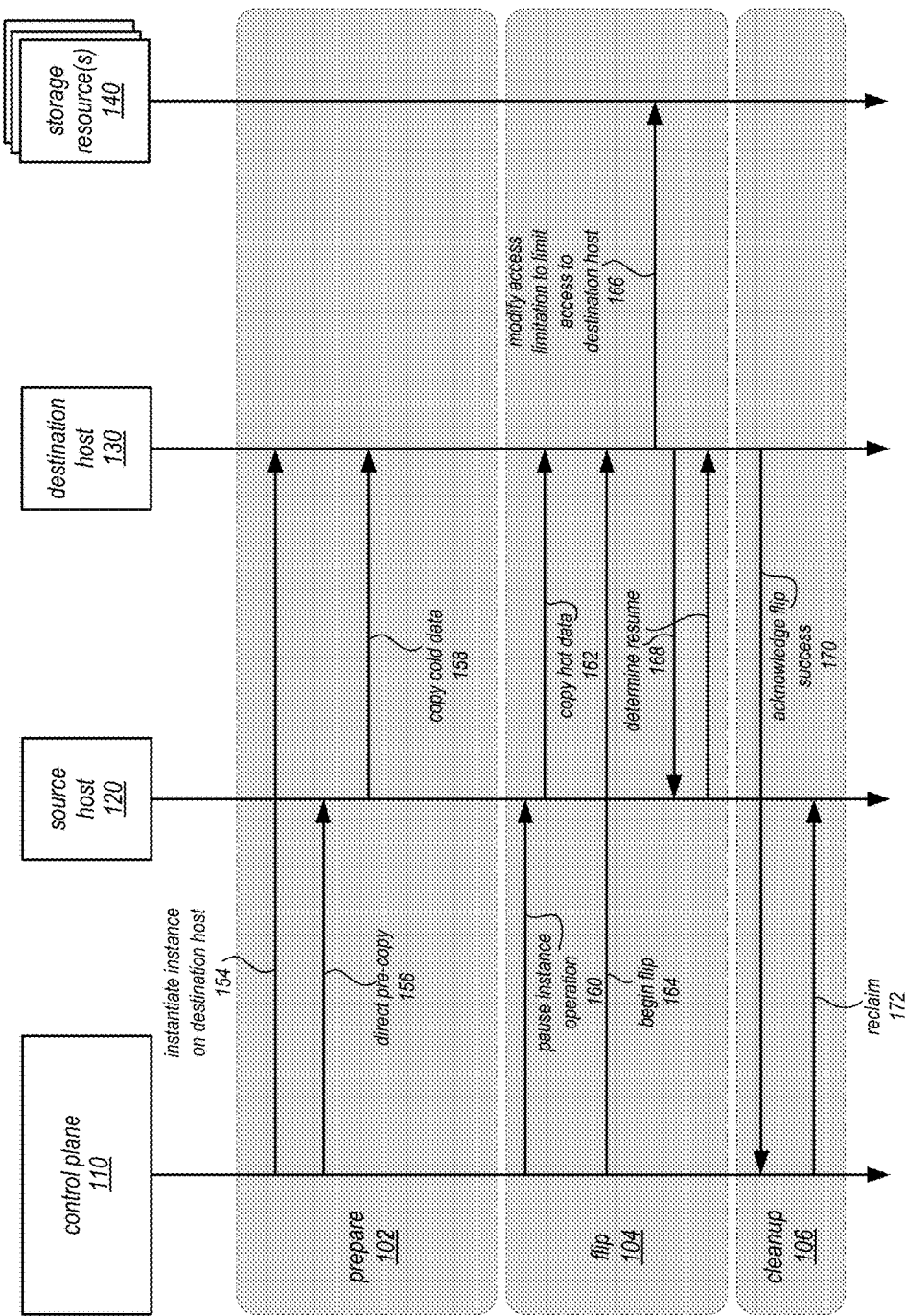
FIG. 1 is a sequence diagram of live migration of virtual computing resources utilizing network-based storage, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement network-based storage access control for migrating live storage clients. Virtual computing resources may be offered by provider networks, allowing customers, users, or other clients of a provider network to operate virtual computing resources hosted by a provider network. These virtual computing resources, referred to herein as virtual compute instances, may be configured to operate customer-specified software (e.g., operating systems, applications, tools, services, etc.), which may be custom or off-the-shelf. For example, a customer of a provider network may procure a virtual compute instance to implement database software to implement a database server. The flexibility provided by utilizing virtual compute instances in a provider network allows customers to develop systems, services, or applications without investing in hardware resources for implementing the systems, services, or applications.

Provider networks, and other systems that utilize or offer virtual computing resources, may take advantage of the ability operate a virtual compute instance at multiple different locations on different physicals resources, such as different server hosts. For example, provider networks may implement thin provisioning policies which places virtual computing resources in a way that potentially overpromises the resources available at a server. Typically, virtual compute instances do not utilize all of the physical resources promised or allocated to the virtual compute instance at a host at the same time. Therefore, overpromising resources at the server host does not typically create problems of insufficient resources. However, in some circumstances, such as when behavior or workload of an instance significantly changes, the thin provisioning of a particular server host for the instance may risk violating performance guarantees or other resource allocations to the instance or other instances at the server host. Instead, the instance (or another instance) may be migrated to a different server host in order to alleviate the change in resource utilization at the source server host.

Different types of migration operations may be performed to migrate instances that are currently operating. Reboot migration operations, for instance, may be performed that shut down a currently operating instance at one host, and boot the instance at a different host. Rebooting hosts allow for a clean break to save data, such as application data, performance state, operating system state, or any other information to a location, that can be used when the instance is restarted. Reboot migration, however, does provide some operational down time for the virtual compute instance. Live migration is another type of migration operation that may be performed. Live migration may have minimal impact upon the operation of a currently operating instance. The instance may experience no reboot or reset of applications. Instead, a destination host for the virtual compute instance may be preconfigured to provide the same execution environment for the instance. A brief pause in the operation of the instance may occur while final information to continue operating is sent to the destination host (e.g., data currently being accessed, changed, or used, such as register values). The instance may then resume operation at the destination host.

Network-based storage resources are often used in conjunction with virtual computing resources, such as instances. For example, as discussed below in FIG. 2, network-based storage resources may provide virtual block-based data volumes (e.g., virtualized disk storage) to instances. Live migration of instances connected to network-based resources creates potential scenarios where data stored for an instance may be placed in an unexpected state. For example, if an instance sends requests to modify data at the network-based storage resource and then is subsequently migrated to the other host, the instance may rely upon the performance of the modifications, without having confirmed whether the modifications were completed. In various embodiments discussed below, live migration of resources that utilize network-based storage may be performed in order to provide an expected state of data in the network-based storage for the migrated resource.

FIG. 1 is a sequence diagram of live migration of virtual computing resources utilizing network-based storage, according to some embodiments. A control plane 110, or other management resource for hosts of virtual computing resources, may identify a virtual compute instance to migrate from a host. For instance, a virtual compute instance hosted at source host 120 may be identified for a live migration to destination host 130. Source host 120 and destination host 130 may be a node, server, or other computing device (such as computing system 2000 described below with regard to FIG. 13) which may be configured to host the virtual compute instance. The virtual compute instance at source host 120 may be a client of data stored at storage resource(s) 140, such as a data volume or object. In various embodiments, access to data stored for the virtual compute instance at storage resource(s) 140 may be limited or restricted to source host 120. For instance, access requests (e.g., I/O requests) for data may be denied if sent from any other host but source host 120.

Control plane 110 may perform live migration in various phases. For example, in some embodiments, as illustrated in FIG. 1, a prepare phase 102, a flip phase 104, and a cleanup phase 106 may be implemented. In prepare phase 102, control plane 110 may direct or perform various operations to prepare destination host 130 to assume operation of the virtual compute instance. For example, control plane 110 may first identify and/or instantiate an instance on destination host 154. Control plane may then direct the pre-copy 156 of instance information from source host 120 to destination host 130. Source host 120 may thus copy cold data 158 (e.g., data stored in memory to destination host). Various other operations to configure the execution environment and/or other settings for the new instance at destination host 130 may also be performed.

In flip phase 104, control plane 110 may pause the operation of the instance 160 at source 120. Source host 120 may then copy hot data 162 (e.g., data currently being accessed, changed, or used as part of the operation of the virtual compute instance) to destination host 130. Control plane 110 may then instruct destination host 130 to begin the flip operation 164. The flip operation may modify the access limitation to limit access to the data for the virtual compute instance to requests coming from the destination host 130. In some embodiments, such as illustrated in FIG. 1, the modification 166 may be made at the storage resource(s) 140, which may maintain and enforce an access control limitation, such as discussed below. In other embodiments, other ways of limiting access to the data to destination host 130 may be implemented. Once access, a resume may be determined 168. For instance, as illustrated in FIG. 1, destination host 130 and source host 120 may coordinate to determine a particular operation point in which to resume operation of the virtual compute instance.

Cleanup phase 106 may be performed to reclaim 172 those resources at source host 120 that are no longer needed to host the virtual compute instance. The instance may be shut down, removed, or otherwise destroyed so that another instance or use for the resources may be performed, such as another task or operation. As indicated at 170, destination host 130 may, in some embodiments, acknowledge success of the flip operation to control plane 110 to instigate cleanup phase 106.

As noted above, network-based storage resource(s) 140 may provide access enforcement to data stored for a virtual compute instance. For example, in some embodiments, storage resource(s) 140 may enforce an access policy that allows a single connection to the resource host for the data stored for the virtual compute instance. Thus, when modifying access 166, destination host 130 may send a connection request to storage resource(s) 140 which may disconnect a previous connection established between source host 120 and storage resource(s) 140. In some embodiments, storage resource(s) 140 may maintain an access control mechanism, such as providing or maintaining connection leases or access rights to identified hosts. State information may be maintained for each host that has established a connection with storage resource(s) 140. For instance, in prepare phase 102, destination host 130 may request a connection with storage resource(s) 140 to establish a standby or inactive connection. Storage resource host(s) 140 may maintain lease state for destination host 130 indicating that destination host may be connected to storage resource(s) but not access data stored at storage resources(s) 140 for the virtual compute instance. When destination host 130 modifies access 166, destination host 130 may send a flip request to promote the standby state of the lease for destination host to a primary state (which may provide access privileges to the data for the virtual compute instance at destination host 130) and demote the lease state for source host 120 to deactivated (which was formerly primary).

Please note that previous descriptions are not intended to be limiting, but are merely provided as logical examples of live migration for virtual computing resources that utilize network-based storage. Various other communications, components, or timing of actions may be implemented. For instance, other systems such as a control plane for storage resources may perform some of the described techniques.

This specification next includes a general description of a provider network, which may implement network-based storage access control for live migrating storage clients. Then various examples of a virtual computing service and a virtual block-based storage service are discussed, including different components/modules, or arrangements of components/module that may be employed as part of implementing the virtual computing service and the virtual block-based storage service. A number of different methods and techniques to perform live migration of virtual computing resources utilizing network-based storage are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
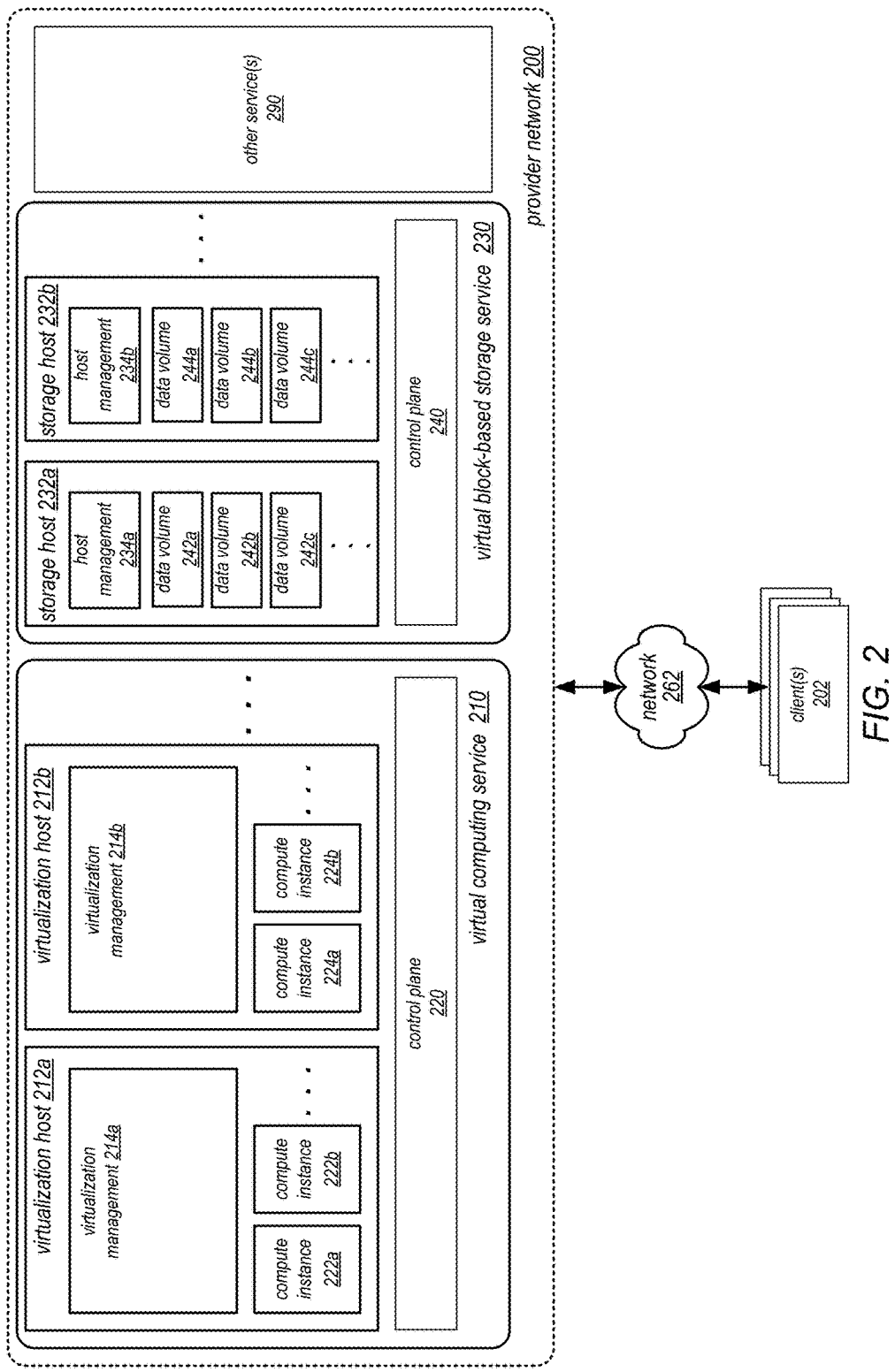
FIG. 2 is a logical block diagram illustrating a provider network that implements a live migration of virtual computing resources that utilize network-based storage, according to some embodiments.

FIG. 2 is a logical block diagram illustrating a provider network that implements a live migration of virtual computing resources that utilize network-based storage, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide computing resources. These computing resources may in some embodiments be offered to clients in units called "instances," 222a, 222b and 224a, 224b such as virtual or physical compute instances or storage instances. Likewise, in some embodiments, provider network 200 may provide storage resources, which may be offered to clients in units called data volumes, 242a, 242b, 242c and 244a, 244b, 244c, which may be virtual or physical block-based storage volumes.

Virtual computing service 210 may be implemented by provider network 200, in some embodiments. Virtual computing service 210 may offer instances 222 and 224 according to various configurations for client(s) 202 operation. A virtual compute instance 222 and 224 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 222 and 224 of provider network 200 in different embodiments, including general purpose or special purpose computer servers, storage devices, network devices and the like. In some embodiments instance client(s) 202 or other any other user may be configured (and/or authorized) to direct network traffic to a compute instance 202.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client (s) 202 applications, without for example requiring the client(s) 202 to access an instance. Applications (or other software operated/implemented by a compute instance 222 and 224 may be specified by client(s) 202, such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Figure 13:
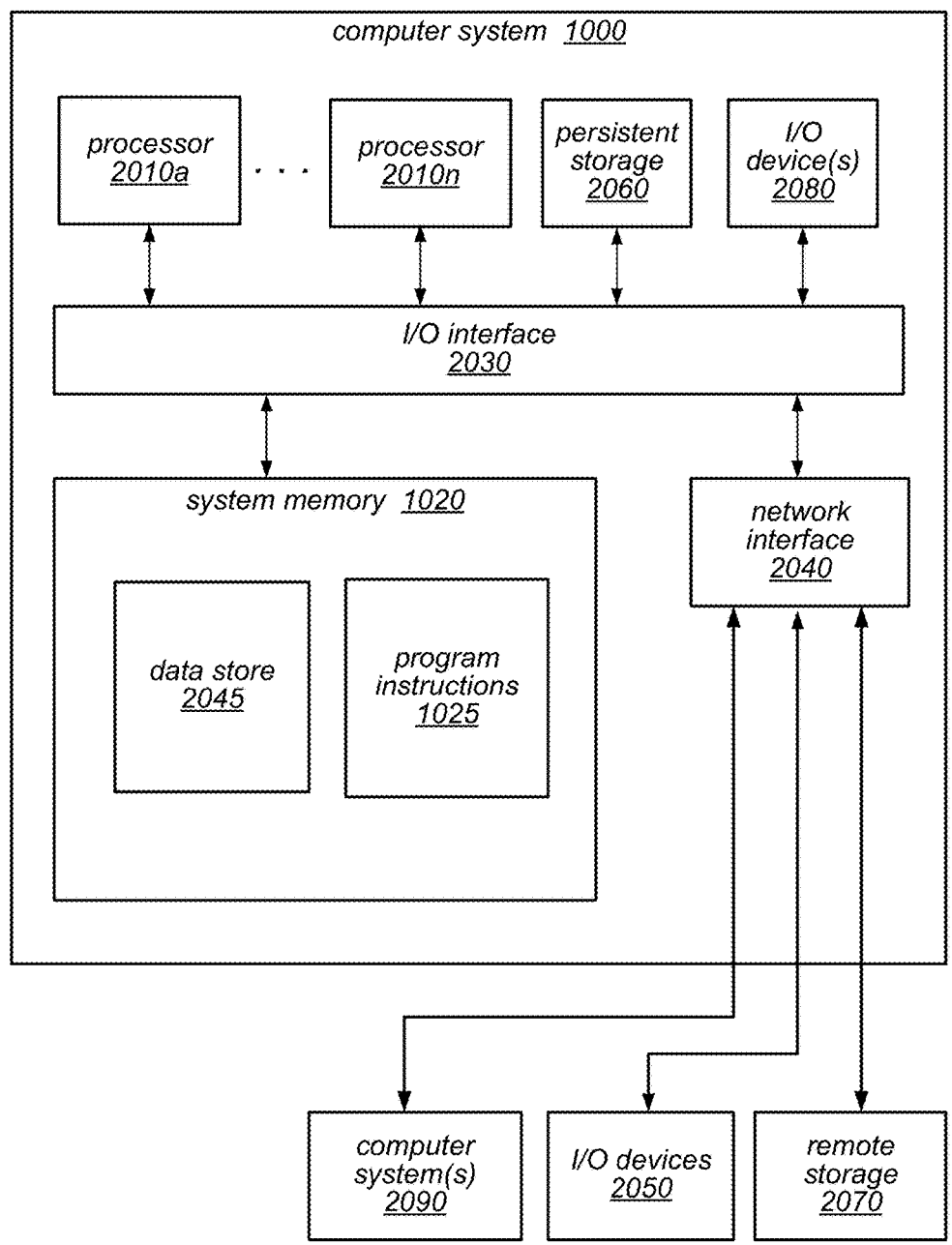
FIG. 13 is a block diagram illustrating an example computing system, according to some embodiments.

As illustrated in FIG. 2, a virtualization host, such as virtualization hosts 212a and 212b, may implement and/or manage multiple compute instances 222a, 222b, 224a, and 222b respectively, in some embodiments, and may be one or more computing devices, such as computing system 2000 described below with regard to FIG. 13. Virtualization hosts 212 may also provide multi-tenant hosting of compute instances. For example, in some embodiments, one virtualization host may host a compute instance for one entity (e.g., a particular client or account of virtual computing service 210), while another compute instance hosted at the same virtualization host may be hosted for another entity (e.g., a different account). A virtualization host may include a virtualization management module, such as virtualization management modules 214a and 214b capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

Virtual computing service 210 may implement control plane 220 to perform various management operations. For instance, control plane 220 may implement resource management to manage the access to, capacity of, mappings to, and other control or direction of compute instances offered by provider network. Control plane 220 may provide both a direct sell and 3$^{rd}$ party resell market for capacity reservations (e.g., reserved compute instances). For example, control plane 220 may allow clients 202 via to learn about, select, purchase access to, and/or reserve capacity for computing resources, either from an initial sale marketplace or a resale marketplace, via a web page or via an API. For example, control plane 220 may provide listings of different available compute instance types, each with a different credit accumulation rate. Control plane 220 may also offer and/or implement a flexible set of resource reservation, control and access interfaces for clients 202 via an interface (e.g., API). For example, control plane 220 may provide credentials or permissions to clients 202 such that compute instance control operations/interactions between clients and in-use computing resources may be performed. In some embodiments, control plane 220 may implement live migration according to FIG. 3 and following.

In various embodiments, control plane 220 may track the consumption of various computing instances consumed for different virtual computer resources, clients, user accounts, and/or specific instances. In at least some embodiments, control plane 240 may implement various administrative actions to stop, heal, manage, or otherwise respond to various different scenarios in the fleet of virtualization hosts 212 and instances 222, 224. Control plane 220 may also provide access to various metric data for client(s) 202 as well as manage client configured alarms. In various embodiments, control plane 220 may implement billing management module. Control plane 220 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

In various embodiments, provider network 200 may also implement virtual block-based storage service 230 for performing storage operations. Virtual block-based storage service 230 is a storage system, composed of a pool of multiple independent storage hosts 232a, 232b, and so on (e.g., server block data storage systems), which provide block level storage for storing one or more sets of data volumes data volume(s) 242a, 242b, 242c, and 244a, 244b, 244c. Data volumes 242, 244 may be mapped to particular client(s) (e.g., a virtual compute instance of virtual compute service 210), providing virtual block-based storage (e.g., hard disk storage or other persistent storage) as a contiguous set of logical blocks. For example, in various embodiments, compute instances 224 may mount, attach, map or otherwise connect to one or more data volumes 242 and/or 244 provided by virtual block-based storage service 230 in order to obtain persistent block-based storage for performing various operations. For example, in various embodiments a data volume may service as a boot volume or root volume, storing operating systems, applications, and/or other software executed on the compute instance mounting the respective boot volume. In some embodiments, a data volume may be divided up into multiple data chunks or partitions (including one or more data blocks) for performing other block storage operations, such as snapshot operations or replication operations. A volume snapshot of a data volume may be a fixed point-in-time representation of the state of the data volume. In some embodiments, volume snapshots may be stored remotely from a storage host 224 maintaining a data volume, such as in another storage service 290. Snapshot operations may be performed to send, copy, and/or otherwise preserve the snapshot of a given data volume in another storage location, such as a remote snapshot data store in other storage service 290.

Storage hosts 232a, 232b may be one or more computing systems or devices, such as a storage server or other computing system (e.g., computing system 2000 described below with regard to FIG. 13). Each storage host may maintain respective replicas of data volumes. Some data volumes may differ in size from other data volumes, in some embodiments. Storage hosts may also provide multi-tenant storage. For example, in some embodiments, one storage host may maintain a data volume for one entity (e.g., a particular client or account of block-based storage service 230), while another data volume maintained at the same storage host may be maintained for another entity (e.g., a different account). Storage hosts may persist their respective data volumes in one or more block-based storage devices (e.g., hard disk drives, solid state drives, etc.) that may be directly attached to a computing system or device implementing the respective storage host. Storage hosts may implement different persistent storage devices. For example, some storage hosts may implement solid state drives (SSDs) for persistent block storage, while other storage hosts may implement hard disk drives (HDDs) or other magnetic-based persistent storage devices. In this way different volume types, specifications, and other performance characteristics may be provided according to the persistent storage devices implemented at the storage host.

Virtual block-based storage service 230 may manage and maintain data volumes in a variety of different ways. Host management 234a, 234b, may be implemented at storage hosts 232a and 232b respectively to manage data stored in different data volumes. Different durability schemes may be implemented for some data volumes among two or more storage hosts 232 as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, storage hosts may then coordinate I/O requests, such as write requests, among the two or more storage hosts maintaining a replica of a data volume. For example, for a given data volume, one storage host may serve as a master storage host. A master storage host may, in various embodiments, receive and process requests (e.g., I/O requests) from clients of the data volume. Thus, the master storage host may then coordinate replication of I/O requests, such as write requests, or any other changes or modifications to the data volume to one or more other storage hosts serving as slave storage hosts. Thus, when a write request is received for the data volume at a master storage host, the master storage host may forward the write request to the slave storage host(s) and wait until the slave storage host(s) acknowledges the write request as complete before completing the write request at the master storage host. Master storage hosts may direct other operations for data volumes, like snapshot operations or other I/O operations (e.g., serving a read request).

Please note, that in some embodiments, the role of master and slave storage hosts may be assigned per data volume. For example, for a data volume maintained at one storage host, the storage host may serve as a master storage host. While for another data volume maintained at the same storage host, the storage host may serve as a slave storage host.

Data may be maintained in data volumes 242, 244 in such a way as to provide security and privacy guarantees for client(s) 202. Host management 234a may enforce access policies for individual data volumes, limiting access to data in data volumes to those requestors that satisfy the access policy (e.g., by presenting appropriate identification or credentials). In this way, data stored in different data volumes on the same storage host for different clients may be confidentially maintained so that an unauthorized request to access data may not be processed (even if the requestor has the right to access another data volume hosted at the same storage host).

Virtual block-based storage service 230 may implement control plane 240 to assist in the operation of block-based storage service 230. In various embodiments, block-based storage service control plane 222 assists in managing the availability of block data storage to clients, such as programs executing on compute instances provided by virtual compute service 210 and/or other network-based services 290 located within provider network 200 and/or optionally computing systems (not shown) located within one or more other data centers, or other computing systems external to provider network 200 available over a network 262. Access to data volumes 242, 244 may be provided over an internal network within provider network 200 or externally via network 262, in response to block data transaction instructions.

Block-based storage service control plane 240 may provide a variety of services related to providing block level storage functionality, including the management of user accounts (e.g., creation, deletion, billing, collection of payment, etc.). Control plane 240 may further provide services related to the creation, usage and deletion of data volumes 242, 244 in response to configuration requests. Control plane 240 may also provide services related to the creation, usage and deletion of volume snapshots on another storage service 262. Control plane 240 may also provide services related to the collection and processing of performance and auditing data related to the use of data volumes 242, 244 and snapshots of those volumes.

Clients 202 may encompass any type of client configurable to submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 202 in a manner that is transparent to applications implement on the client 202 utilizing computational resources provided by the compute instance. Client(s) 202 may be associated with particular user accounts, user identifiers, or other information which may indicate the access rights, resources, and other associated information maintained at provider network 200 on behalf of a client 202.

Clients 202 may convey network-based services requests to provider network 200 via external network 262. In various embodiments, external network 262 may encompass any suitable combination of networking hardware and protocols necessary to establish network-based communications between clients 202 and provider network 200. For example, a network 262 may generally encompass the various telecommunications networks and service providers that collectively implement the Internet. A network 262 may also include private networks such as local area networks (LANs) or wide area networks (WANs) as well as public or private wireless networks. For example, both a given client 202 and provider network 200 may be respectively provisioned within enterprises having their own internal networks. In such an embodiment, a network 262 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 202 using a private network rather than the public Internet.

Figure 3:
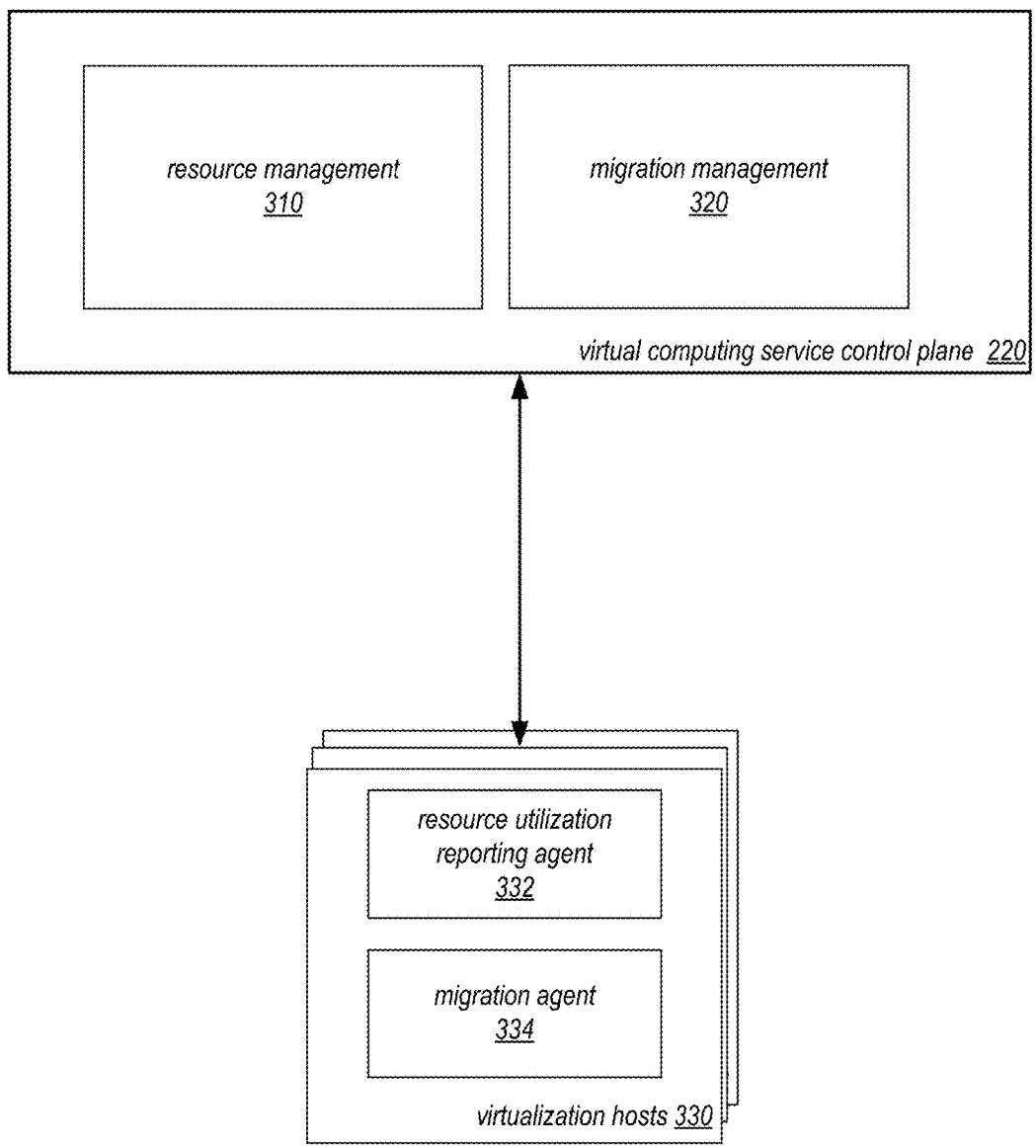
FIG. 3 is a logical block diagram illustrating migration management for virtual compute instances, according to some embodiments.

FIG. 3 is a logical block diagram illustrating migration management for virtual compute instances, according to some embodiments. Control plane 220 as noted above may manage the deployment, migration, utilization, and other aspects of virtual compute instances hosted in a virtual computing service, such as service 210 in FIG. 2. In at least some embodiments, control plane 220 may implement resource management 310. Resource management 310 may make placement decisions for new instances and migration decisions for currently operating instances. For instance, resource management 310 may monitor resource utilization data collected by resource utilization reporting agents 332 located at virtualization hosts 330. Processing utilization, storage utilization, network utilization, or utilization of any other physical resource may be reported to resource management 310. Based on the utilization information, resource management 310 may identify migration operations for different instances currently operating at hosts 330. Different provisioning schemes, such as thin provisioning, may trigger migration operations for instances. Consider the scenario where a virtualization host guarantees processing capability to four instances at the virtualization host greater than the physical resources at the virtualization host can provide at the same time. While it is unlikely that all four instances would request the full use of the guaranteed processing capability at the same time, an instance that begins utilizing a greater amount of processing capacity at the virtualization host may be identified for migration. In another example, resource management 310 may apply various rules or thresholds to current total utilization of instances at a virtualization host (e.g., processing capacity threshold of 80% or network utilization threshold of 70%). Resource management 310 may then notify or indicate instances to migrate to migration management 320.

Migration management 320 may direct the performance of various portions of live migration (as discussed below in FIGS. 5-12) or may direct the performance of other migration types, such as reboot migration. Migration management 320 may track the progress of live migration as performed by migration agents 334 on hosts 330. For instance, for each phase of live migration completed, migration agents 334 may report the completion of the migration phase (as discussed above in FIG. 1). Migration management 320 may configure how various portions or phases of live migration are to be performed at migration agents. For instance, migration management 320 may determine when to perform a flip request or when to enter a cleanup phase.

Figure 4:
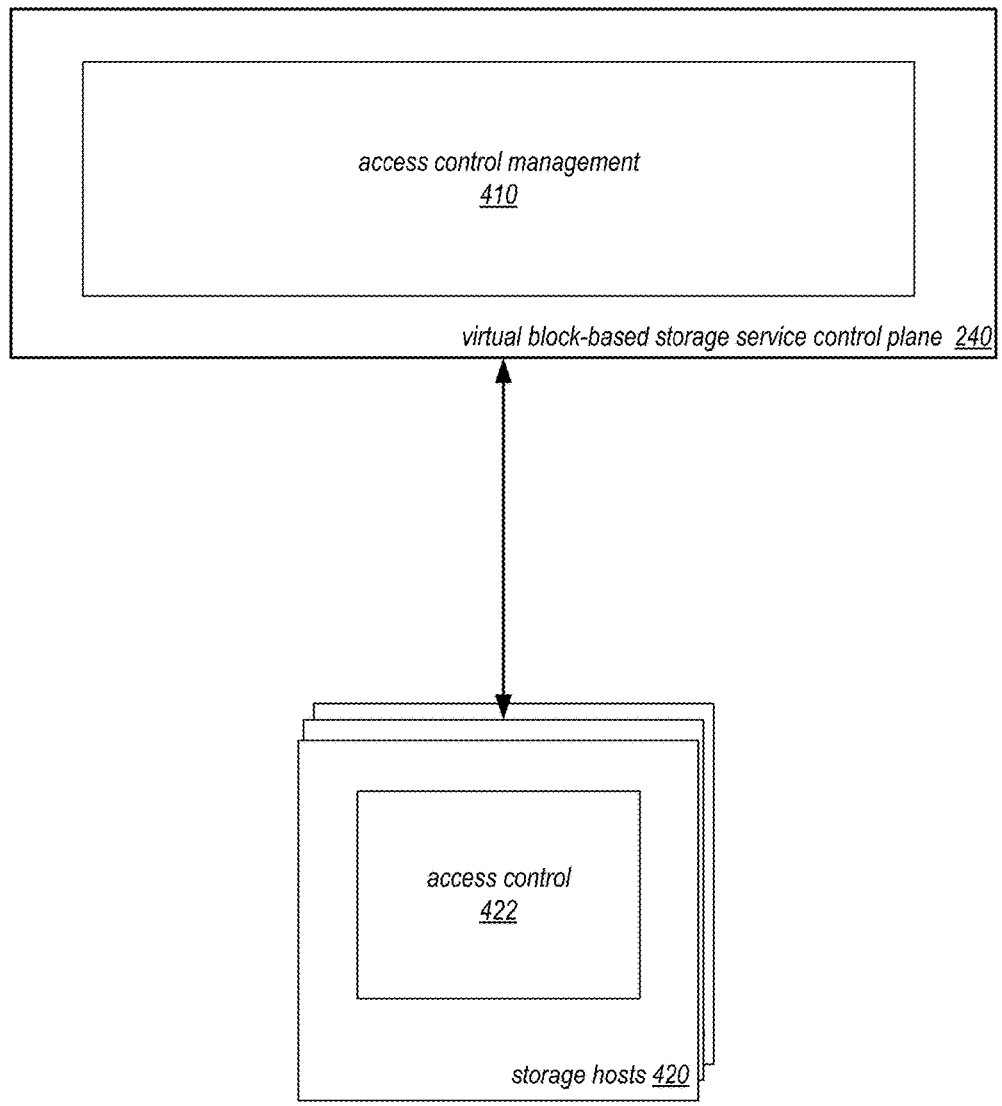
FIG. 4 is a logical block diagram illustrating network-based storage access control for migrating live storage clients, according to some embodiments.

FIG. 4 is a logical block diagram illustrating network-based storage access control for live migration storage clients, according to some embodiments. Virtual block-based storage service control plane 240 may implement access control management 410, in various embodiments. Access control management 410 may maintain, update, or describe access controls (e.g., policies or lease state information) for storage hosts 420 that implement access controls 422. For instance, when a host for an instance, such as hosts 212 or 330, establishes a connection with a storage host 420, the hosts 212 or 330 may request a lease from access control management 410. If granted, the hosts 212 or 330 may then provide a lease identifier in a connection request to a storage host, which may in turn validate the lease with access control management 410 before allowing the connection. Access controls 422 may be maintained at storage hosts 420 (which may be similar to storage hosts 232 in FIG. 2) to control access to data volumes stored at storage hosts 420 which may be utilized by virtual compute instances. In at least some embodiments, access controls 422 may maintain lease state information for different virtualization hosts that have established connections with the storage hosts 420 to access particular data volumes according to the rights granted under different lease states, such as those discussed below with regard to FIG. 8. In at least some embodiments, access controls 422 may enforce an access policy that only allows a single connection to be established for a particular data volume at a time.

Figure 5:
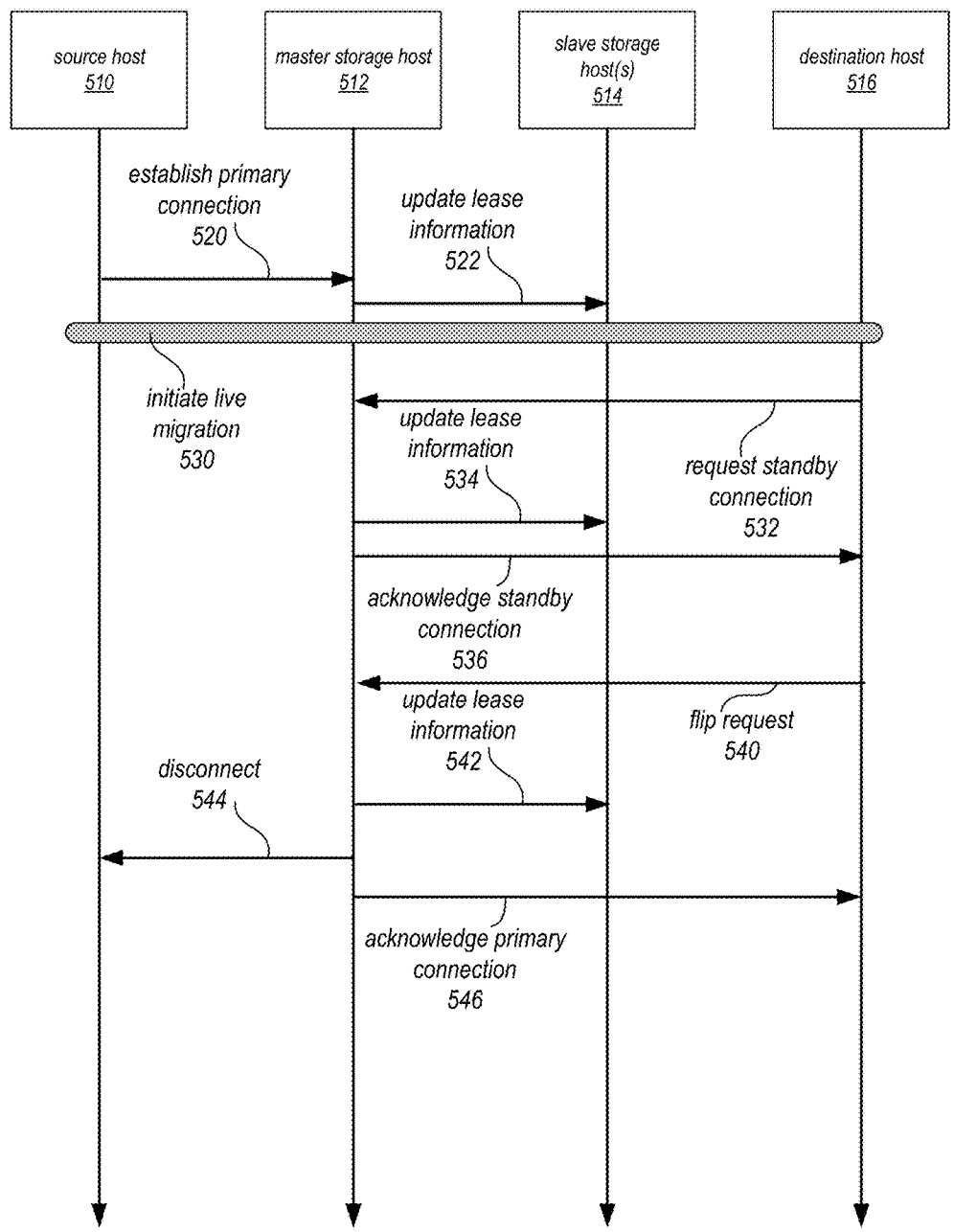
FIG. 5 illustrates interactions between virtualization hosts involved in a live migration of a virtual compute instance and storage hosts that maintain data for the virtual compute instance, according to some embodiments.

As noted above, in some embodiments, network-based storage resources, like data volumes discussed above, are implemented in replicated environments. For access control mechanisms to be implemented consistently, lease state information may be replicated to multiple storage hosts. FIG. 5 illustrates interactions between virtualization hosts involved in a live migration of a virtual compute instance and storage hosts that maintain data for the virtual compute instance, according to some embodiments.

Source host 510 which hosts a virtual compute instance may have established a primary connection 520 with master storage host 512 to provide access to a data volume hosted at master storage node 512 and replicated at slave storage host(s) 514 for an instance hosted at source host 510. Master storage host 512 may establish and/or validate that master storage host 512 has the lease in a primary state. Master storage host 512 may update lease information 522 at slave storage host(s) 514.

A live migration event 530 may be initiated for the virtual compute instance hosted at source host 510. As part of a live migration operation, destination host 516 may request a connection with a standby lease state 532. Master storage host 512 may again update lease information 534 at slave storage host(s) 514. Master storage host may then acknowledge the standby connection 536 to destination host 516. When ready, or when instructed, destination host 516 may send a flip request 540 to promote the standby lease associated with destination host 516 to a primary lease state. Master storage host 542 may update lease information 542 at slave storage host(s) 514 in order to maintain a consistent view of access to the data volume, that access to the data volume is now limited to destination host 516. Master storage host 512 may, in some embodiments, disconnect 544 the connection with source host 510. Master storage host may then acknowledge the primary connection 546 with destination host 516, which may then access the data volume on behalf of the virtual compute instance when it resumes operation at destination host 516.

Please note that the interactions discussed above in FIG. 5 with regard to performing live migration are examples. Various other systems, components, and/or devices may be added or removed. For instance, the data volume may be partitioned amongst multiple master storage hosts with corresponding slave storage hosts. A standby connection and primary connection may have to be established at each set of hosts for each partition of the data volume in order to complete the live migration. In some embodiments, many of the techniques described above and below with regard to modifying an access limit could be performed by a source host (e.g., sending a request to promote the lease state for a destination host to primary and deactivate the lease for the source host). Thus, the previous discussion is not intended to be limiting.

Figure 6:
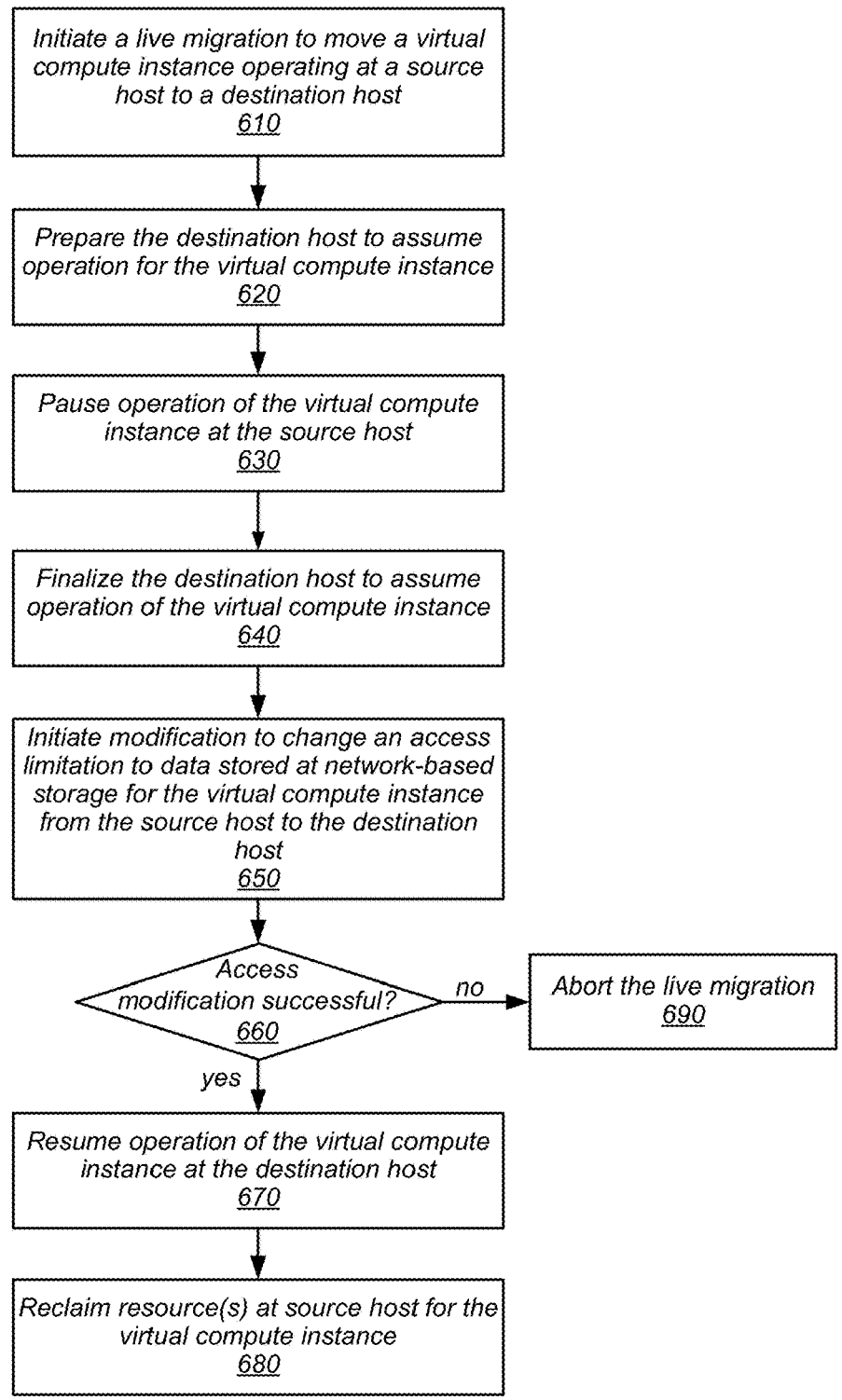
FIG. 6 is high-level flowchart illustrating various methods and techniques for performing a live migration for virtual computing resources that utilize network-based storage, according to some embodiments.

The examples of implementing live migration for virtual computing resources that utilize network-based storage as discussed above with regard to FIGS. 2-5 have been given in regard to virtual computing resources offered by a provider network. Various other types or configurations of distributed systems or services may implement these techniques. Other systems that implement virtual computing resources which may be migrated live may implement these techniques. FIG. 6 is high-level flowchart illustrating various methods and techniques for performing a live migration for virtual computing resources that utilize network-based storage, according to some embodiments. Various ones of the systems described above may implement some or all of these techniques.

As indicated at 610 a live migration operation to move a virtual compute instance operating at a source host to a destination host may be initiated, in various embodiments. For example, a management service, such as resource management service 310 in FIG. 3 above, may determine a more optimal or efficient placement for an operating virtual compute instance. The virtual compute instance may, in some embodiments, need more underlying physical resources, triggering a live migration of the virtual compute instance to a host with resources sufficient to better satisfy the resource needs of the virtual compute instance, or a host itself may be experiencing stress due to more demand for physical resources than is available (or above defined limits).

As indicated at 620, a live migration operation may include preparing the destination host to assume operation for the virtual compute instance, as indicated 620. For example, various configuration information about the virtual compute instance, such as the execution environment (e.g., hardware resources like network features, such as network addresses and/or MAC addresses, or CPU features) may be identified. Network-based storage resources, such as data volumes offered by a virtual block-based computing storage service in FIG. 2 or network attached storage (NAS) devices or any other storage devices access via a network that are attached, connected, or utilized by the virtual compute instance may be identified. Thus, the virtual compute instance may be a client of the network-based storage, in some embodiments. The configuration and network-based storage resources may be used to configure the destination host to provide the same execution environment for the virtual compute instance as exists on the source host. Data, such as cold data not being utilized in system memory for the virtual compute instance may be copied to the destination host to be instantiated for the virtual compute instance.

Upon completion of the preparation of the destination host, the operation of the virtual compute instance may be paused at the source host, as indicated at 630, in various embodiments. For instance, a request or command to halt operation may be sent to or performed at the source host. In some embodiments, the destination host may be finalized to assume operation of the virtual compute instance, as indicated at 640, in some embodiments. For example, hot data (e.g., data that is being accessed, utilized, or changed at the source host) may be copied or transferred to the destination host. As indicated at 650, modification to change an access limitation to data stored at the network-based storage for the virtual compute instance may be initiated to limit access to the destination host (instead of the source host), as indicated at 650, in various embodiments. As discussed in the earlier examples and the figures below, an access control or policy may be enforced at the network-based storage. A request may be made to change the policy or control for the destination host. In some embodiments, access limitations may be enforced at the hosts of the virtual compute instance, such as at the source and destination host. Therefore, in at least some embodiments, the modification may be made to change the access limitation at the source host.

As indicated at 660, if the access modification is successful, then live migration may continue. For instance, the network-based storage resource may acknowledge the completion of the access limitation modification. If, as indicated by the negative exit from 660 and the access limitation is not modified, then the live migration may be aborted, as indicated at 690. In at least some embodiments, operation of the virtual compute instance may be un-paused at the source host and the virtual compute instance may resume. In some embodiments, a different type of migration operation, such as a reboot migration may be performed to migrate the virtual compute instance. If, however, as indicated by the positive exit from 660, the access modification is successful, then operation of the virtual compute instance may resume at the destination host, as indicated at 670. For example, the destination host may determine a resume point based on communication with the source host (e.g., a handshake protocol) or other information provided to the destination host to determine a particular operation, task, instruction, or place to resume the paused operation of the virtual compute instance. As indicated at 680, resource(s) at the source host for virtual compute instance may be reclaimed, in some embodiments. For example, a slot may be freed to allow another virtual compute instance to be hosted at the source host or the resources may be allocated to another task or operation being performed at the source host.

Figure 7:
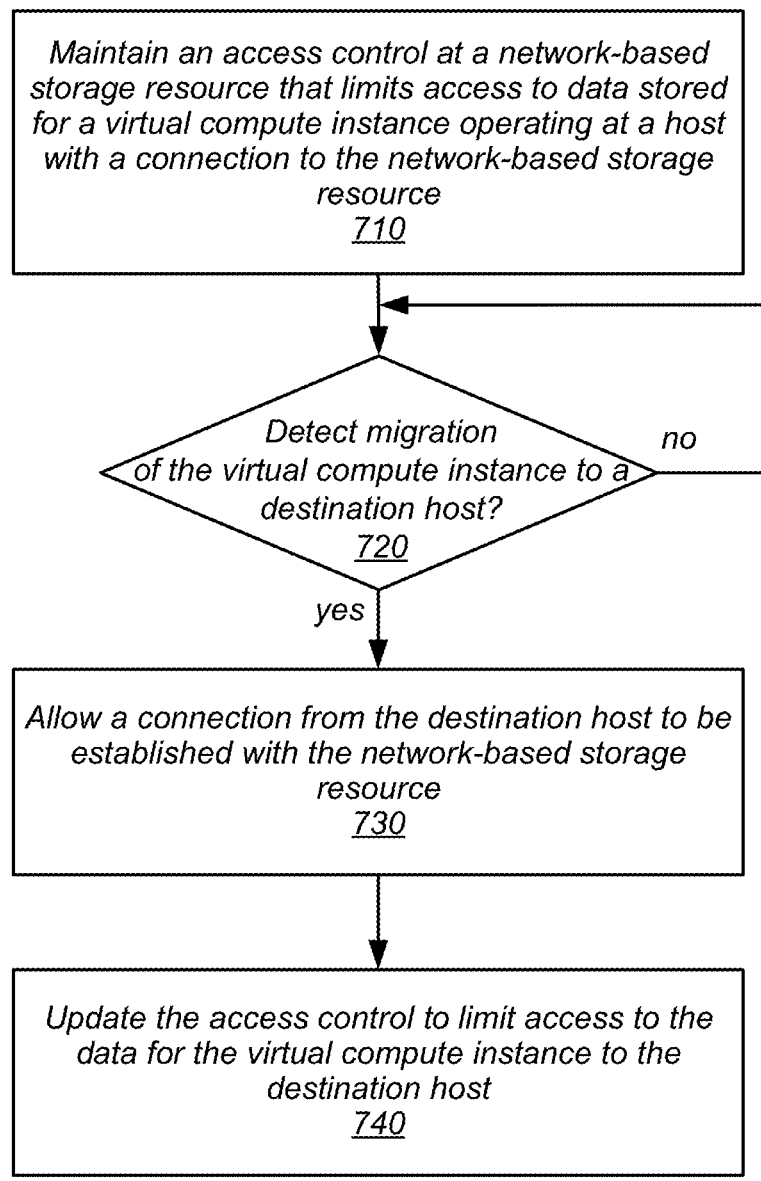
FIG. 7 is a high-level flowchart illustrating various methods and techniques for network-based storage access control for migrating live storage clients, according to some embodiments.

Network-based storage may implemented access controls for virtual computing resources that are being migrated live. FIG. 7 is a high-level flowchart illustrating various methods and techniques for network-based storage access control for migrating live storage clients, according to some embodiments. As indicated at 710, an access control may be maintained at network-based storage that limits access to data stored for a virtual compute instance operating at a host with a virtual connection to the network-based storage resource. For instance, the access control maintained may be an enforcement policy which limits access to the network-based storage resource (e.g., a particular data volume or object) to access requests from a single connection with a host. For instance, a source host may have sole access rights to the network-based storage resource as long as a connection is maintained with the network-based resource.

Figure 8:
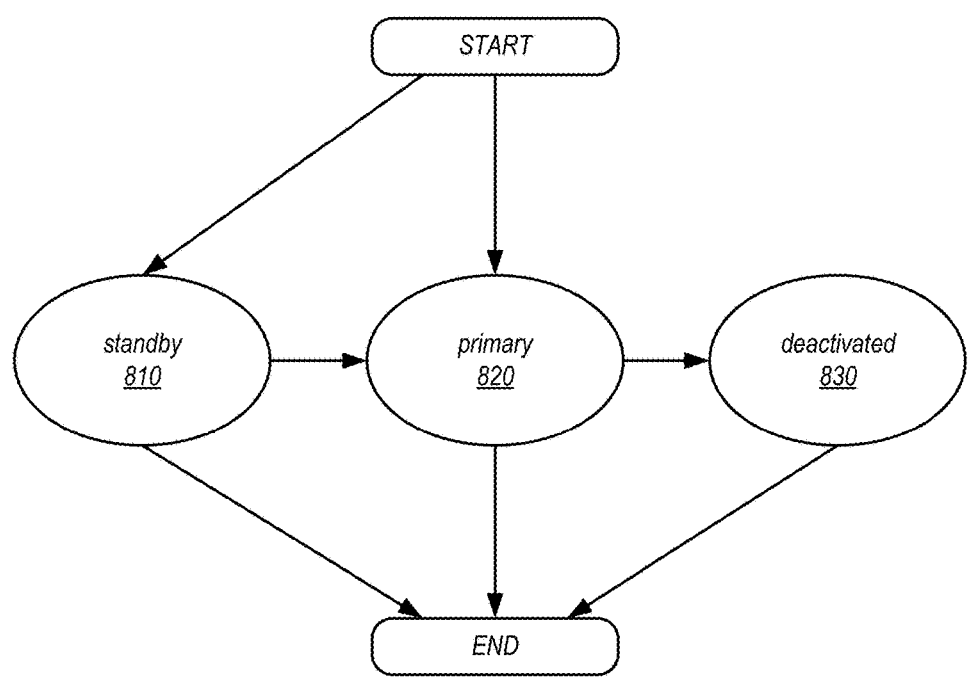
FIG. 8 illustrates an example state diagram of lease states that may be maintained at a network-based resource, according to some embodiments.

In some embodiments, multiple connections with network-based storage resources may be allowed. Various information describing the access rights of the different connections may be maintained as different connection lease states. FIG. 8 illustrates an example state diagram of lease states that may be maintained at a network-based resource, in various embodiments. As illustrated in FIG. 8, connections may be established that start out as a primary least state 820 or a standby lease state 810. A primary lease state 820 may give sole access rights to the host associated with the primary lease state (e.g., only one host may be associated with the primary lease state at any time), providing the host with an active connection to the network-based storage resource. A standby lease state 810 may be implemented to allow a connection to be established with a network-based storage resource (allowing all of the various requests and responses to be performed) without allowing the associated host access rights to the data at the network-based storage resource, providing an inactive. For example, a standby lease state may be provided to a destination host for a live migration so that the destination host may save time and pre-establish the connection with network-based resource. In this way, the time to flip the network-based storage resource between a source and destination host may be reduced (as changes may only involve updating the state information at the network-based resource). A deactivated state 830 may also be described which identifies hosts that previously held primary connections but are now prohibited from establishing a connection with the network-based resource (e.g., preventing an erroneous source host from regaining access to network-based storage resource that has been flipped). As depicted in FIG. 8, some connections may be immediately assigned a lease state of standby 810 (as in the migration example described above) or primary (e.g., when a single compute instance first connects to the network-based storage resource). Additionally, as depicted in FIG. 8, all lease states can be terminated (e.g., by a control plane or storage host revoking the lease and disconnecting the resource as a result of a failure or other triggering condition).

Turning back to FIG. 7, a migration of the virtual compute instance to a destination host may be detected, as indicated at 720. For example, in some embodiments, a standby connection request may be received at the network-based resource, indicating the destination host, source host, and virtual compute instance (e.g., by respective identifiers) which are involved in the live migration operation. Alternatively, a source host, control plane, or other system may notify the network-based resource. In some embodiments, a connection request or access request sent by a different host than a host currently connected to the network-based resource (e.g., a source host) may trigger the detection of a migration.

As indicated by the positive exit from 720, in response to detecting the migration of the virtual compute instance to the destination host, a connection from the destination host may be allowed to be established with the network-based storage resource, as indicated at 730. Various communications, messages, and/or information may be exchanged according to different communication protocols to establish the connection. As discussed above with regard to FIG. 8, allowing the connection may include establishing a least state for the connection, such as a standby lease state.

In some embodiments, the access control may be updated to limit access to the data for the virtual compute instance at the network-based storage resource to the destination host, as indicated at 740. For example lease state information for the destination host may be changed, promoting the destination host to primary and demoting the source host to deactivated. In at least some embodiments, the update to the access control may be triggered implicitly, by receiving an access request from the destination host at the network-based storage resource. In other embodiments, a timeout or other threshold may be implemented to automatically proceed with the flip without explicit authorization from the destination host. For example, a flip time threshold may be exceeded triggering a flip to update the access control.

Figure 9:
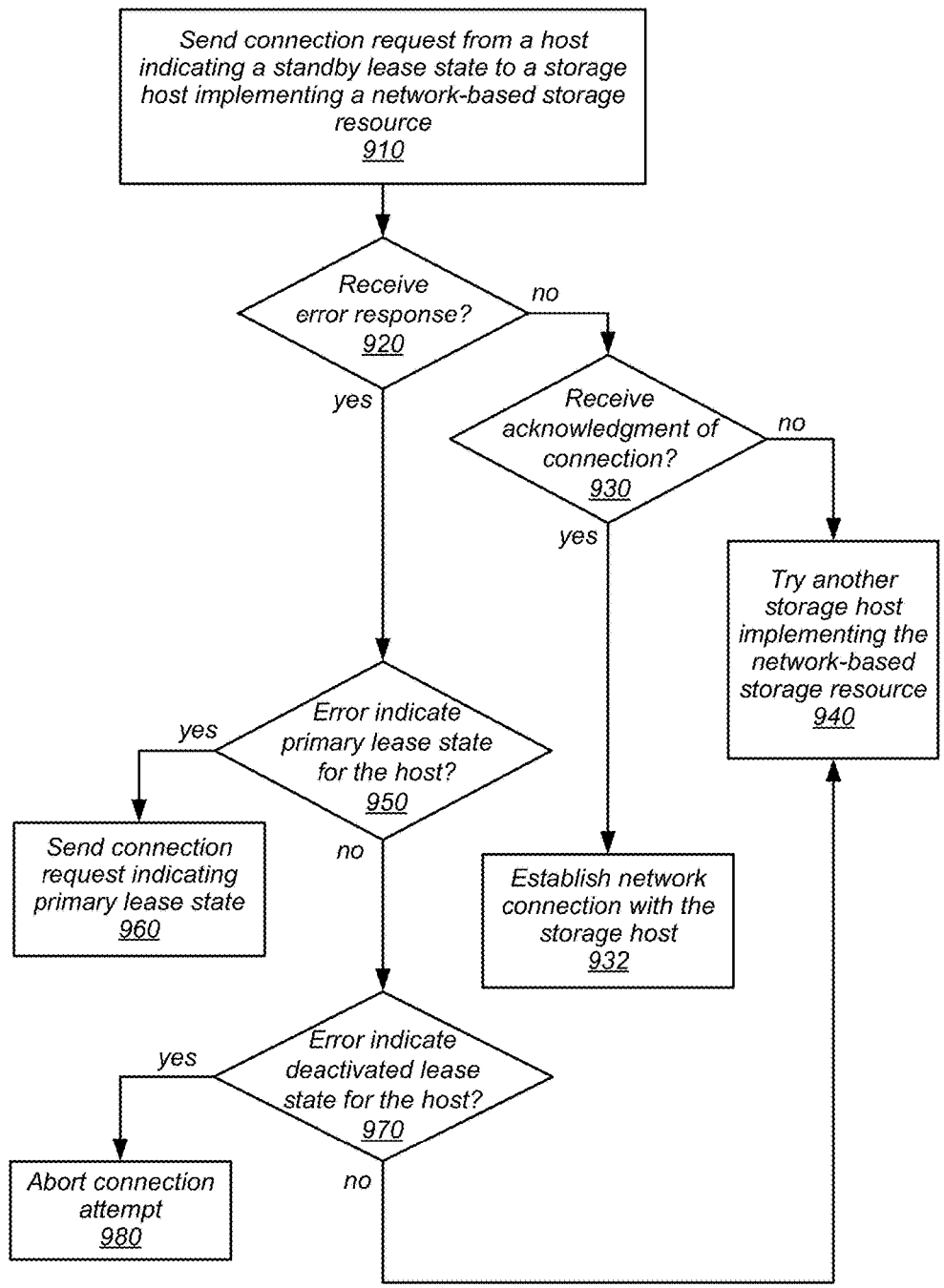
FIG. 9 is a high-level flowchart illustrating various methods and techniques for sending a standby connection request to a network-based storage resource, according to some embodiments.

FIG. 9 is a high-level flowchart illustrating various methods and techniques for sending a standby connection request to a network-based storage resource, according to some embodiments. As discussed above, a destination host (or migration agent operating on the destination host) may send a request to establish a standby connection with a storage host that implements the network-based storage resource. However, other hosts, or the destination host itself, may be mistaken as to the state of a lease for a connection to a network-based storage resource (e.g., may have lost a connection to the network-based resource). Therefore, various different tasks may be performed as part of establishing a standby connection.

As indicated at 910, a connection request may be sent from a host indicating a standby lease state to a storage host implementing a network-based storage resource. For instance, the host may have discovered a list of storage hosts, such as those described above in FIGS. 2 and 4, that host a replica and/or partition of data, and thus may select one to send the request. The request may include an identifier of the lease to be evaluated, source host, and/or virtual compute instance. A response may be received from the storage host. If no error response is received, as indicated by the negative exit, then an acknowledgment of connection may be received, as indicated at 930. If so, as indicated by the positive exit from 930, then the network connection with the storage host may be established, as indicated at 932 (e.g., performing the various handshakes, requests, messages, or responses according to a connection protocol, such as TCP, implemented to communicate with the storage host). If no response is received at all, as indicated by the negative exit from 930, then another storage host implementing the network-based resource may be tried, as indicated at 940. For instance, if the request is sent to a master storage host and no response is received, then a request for a standby connection may be sent to a slave storage host.

If, as indicated by the negative exit form 920, an error response is received, then error may be evaluated to determine a responsive action. For instance, if the error indicates that the storage host has a primary least state associated with the host, then the connection request may be retried indicating the primary lease state for the host, as indicated at 960. As indicated at 970, if the error indicates that the lease state for the host is deactivated, then the connection attempt from the host may be aborted as indicated, at 980. For instance, a host may have erroneous state information for virtual compute instance indicating a current live migration when the live migration operation was already completed. In some embodiments, the connection request may be retried as indicated by the negative exit from 970. For example, a back off scheme may be implemented which waits a period of time before retrying the request at another storage hosting implementing the network-based storage resource.

Figure 10:
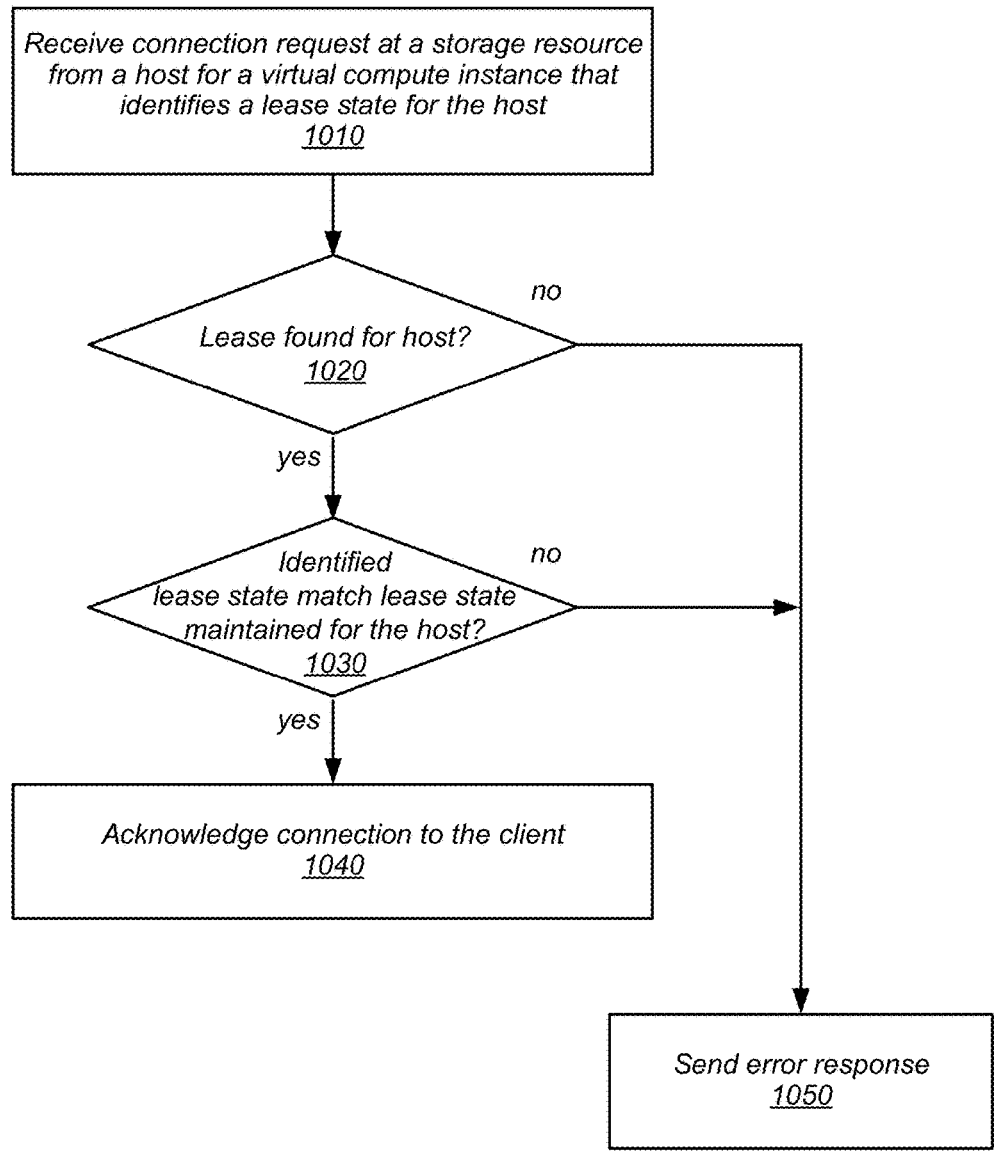
FIG. 10 is a high-level flowchart illustrating various methods and techniques for processing a connection request at a network-based storage resource implementing lease state for an access control, according to some embodiments.

FIG. 10 is a high-level flowchart illustrating various methods and techniques for processing a connection request at a network-based storage resource implementing lease state for an access control, according to some embodiments. As indicated at 1010, a connection request may be received at a network-based storage resource from a host for a virtual compute instance. The connection request may identify a lease state for the host (e.g., by a lease identifier, state descriptor, and a host identifier). As indicated at 1020, a check for the lease may be made. If no lease is found, then as indicated by the negative exit from 1020, an error response may be sent. The error response may indicate that no lease is found. If, however, a lease is found, as indicated by the positive exit from 1020, then a determination may be made as to whether the identified lease state matches the lease state maintained for the host, as indicated at 1030. For example, if the lease state indicates a primary lease, then the lease information may be checked to see if the host has a lease indicated in primary lease state. If the lease state maintained at the network-based storage resource is different than the state identified in the request, then an error response may be sent, as indicated by the negative exit from 1030 and 1050. The error response may identify the lease state maintained at the network-based storage resource (e.g., standby, primary, deactivated). However, if the indicated lease state matches the maintained lease state, then the connection may be acknowledged to the client, as indicated at 1040.

Figure 11:
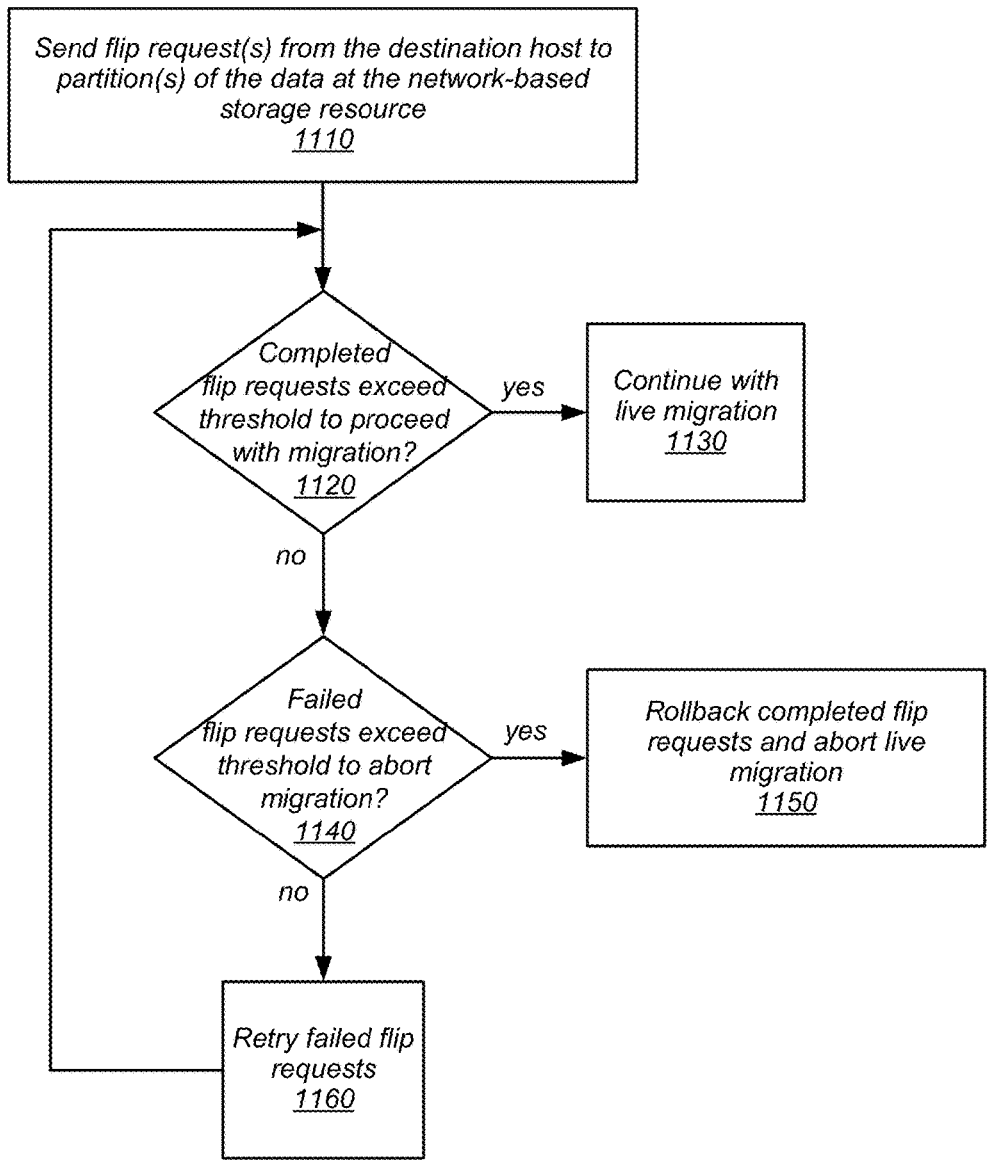
FIG. 11 is a high-level flowchart illustrating various methods and techniques for sending flip requests to partitions of data at the network-based storage resource, according to some embodiments.

Data stored at a network-based storage resource may be partitioned in various embodiments. For example, a data volume, as discussed above with regard to FIGS. 2-5, may be partitioned amongst multiple storage hosts storing different portions of the data. In such scenarios, hosts may have to establish connections with the multiple partitions in order to access the data for a virtual compute instance. FIG. 11 is a high-level flowchart illustrating various methods and techniques for sending flip requests to partitions of data at the network-based storage resource, according to some embodiments.

Flip requests may be requests to modify the access control at a network-based storage resource, to flip the network-based storage resource to a destination host so that the destination host may access data stored at the network-based storage resource for a virtual compute instance. As indicated at 1110, flip request(s) may be sent from the destination host to the partition(s) of the data at the network-based storage resource, in some embodiments. A partition map, or other listing or partitions of the data may be maintained identifying storage hosts (e.g., master and slave(s)) that maintain the different partitions of the data. Acknowledgements of flip completion may be received, in various embodiments. If enough completed flip requests are received that exceed a threshold to proceed with migration, as indicated by the positive exit from 1120, then a destination host may proceed with completing live migration. The threshold to proceed with migration may be strict, requiring all partitions to acknowledge completion of the request. However, in some embodiments, a different threshold, such as a 50% may be implemented. If live migration proceeds in such a scenario with a lower threshold, without completing the flip at all partitions, then various repair or recovery operations to complete the flip may be performed after completing live migration.

In some embodiments, a threshold may be evaluated with regards to failed flip requests that if exceeded, live migration may be aborted, as indicated at 1140. For example, if more than 50% of partitions fail to complete the request, or acknowledge an error to the flip request, then the threshold may be exceeded. As indicated by the positive exit from 1140, completed flip requests may be rolled back. For instance, a rollback instruction could be sent to completed partitions instructing the partition to return to the previous state of lease information for hosts at the partition. If, however, the failure threshold is not exceeded, then failed flip requests may be retried, as indicated at 1160. For instance, retried flip requests may be sent to a different storage host for a partition that failed (e.g., instead of a master host for the partition, send the request to a slave host for the partition).

Figure 12:
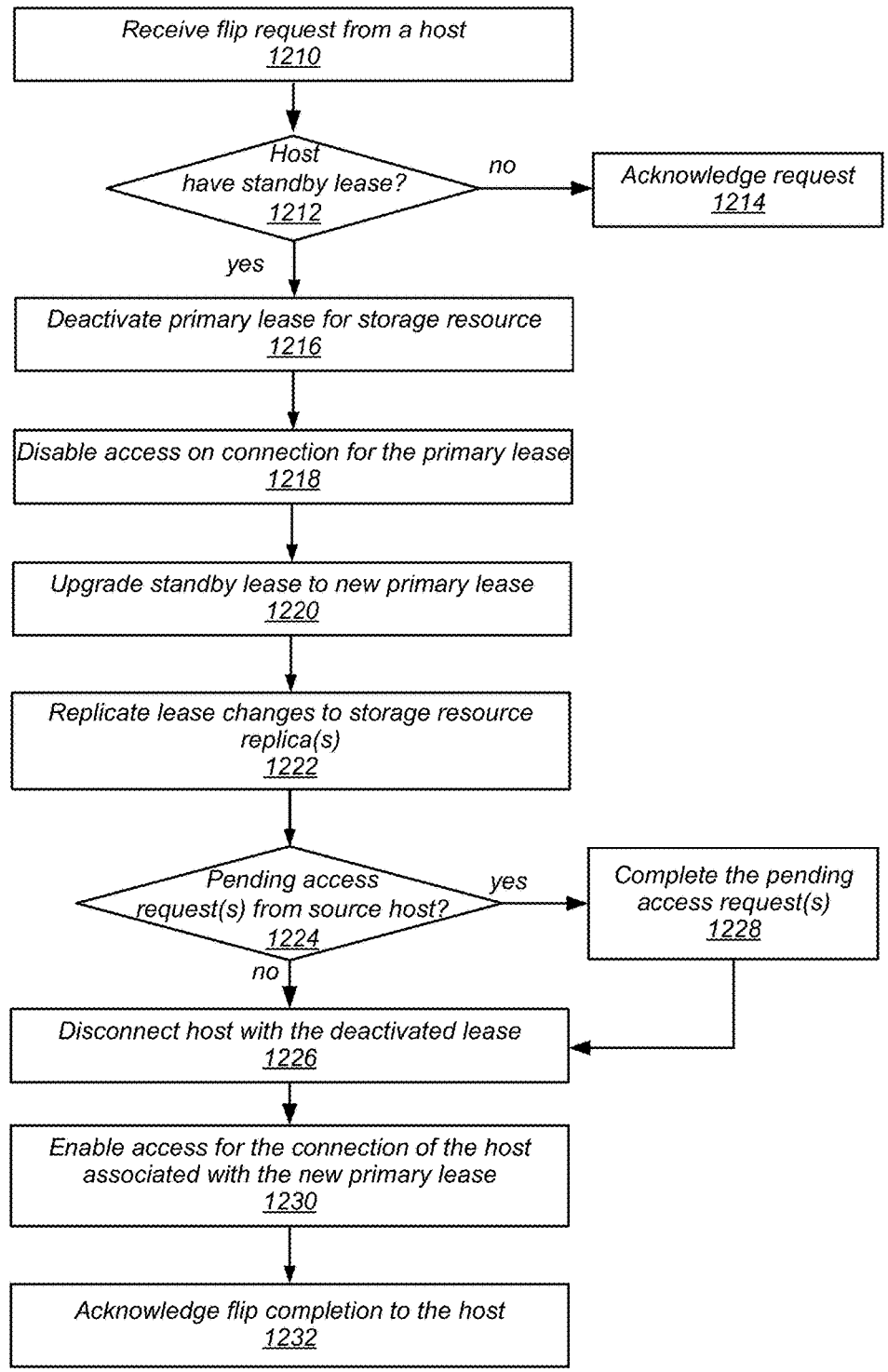
FIG. 12 is a high-level flowchart illustrating various methods and techniques for processing flip requests at a network-based storage resource, according to some embodiments.

FIG. 12 is a high-level flowchart illustrating various methods and techniques for processing flip requests at a network-based storage resource, according to some embodiments. As indicated at 1210, a flip request may be received from a host. If the host does not have the standby lease, as indicated by the negative exit from 1212, then flip operation may be acknowledged to the host 1214, as in some embodiments, the flip operation may be idempotent and only performed once (e.g., by the host with the standby lease).

Although not illustrated in FIG. 12, in some embodiments, the network-based resource may implement a master and slave host(s) for data. If the flip request is received at a slave host, the slave host may attempt to switch into the master role for the data. For example, the slave host may communicate with a control plane and/or other replicas to attempt become the master. If the slave host succeeds, then the flip operation may proceed as illustrated in FIG. 12. However, if the slave host is unable to become the master, then the slave host may send a failure response to the host indicating that the flip request did not complete.

As indicated at 1216, the primary lease may be deactivated. For instance, the state information connections to the network-based storage resource may be updated to change the connection identified as primary to a deactivated lease state. As indicated at 1218, access on the connection for the primary lease may be disable. A logical barrier may be imposed, that denies any requests received after the access is disabled. In some embodiments, a lock or other control mechanism may be acquired by the access control to prevent any access to the data. Access requests received after disablement may be denied and/or returned with an error message. As indicated at 1220, the standby lease maintained in the lease state information may be upgraded to be a new primary lease. For instance, the lease state information may be updated to change the state of the standby lease. In embodiments, where other replicas of the data are maintained at different storage hosts, then the change to lease state information may be replicated to the different storage hosts maintaining the replica (e.g., replica group members), as indicated at 1222.

In at least some embodiments, access requests may be buffered or queued at a network-based storage resource prior to being performed. If these pending access request(s) exist, then, as indicated by the positive exit from 1224, the pending access request(s) may be completed, as indicated at 1228. As indicated at 1226, the host with the deactivated lease may then be disconnected, in some embodiments. Then, as indicated at 1230, access may be enabled for the connection with the host associated with new primary lease. Completion of the flip may be acknowledged to the host, as indicated at 1232.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of live migration for virtual computing resources utilizing network-based storage as described herein may be executed on one or more computer systems, which may interact with various other devices. FIG. 13 is a block diagram illustrating an example computer system, according to various embodiments. For example, computer system 2000 may be configured to implement nodes of a compute service, system, host, node, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the provider network described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 22025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
a plurality of compute nodes comprising one or more processors and memory, configured to implement:
  a plurality of hosts for virtual compute instances;
  a control plane; and
the control plane, configured to:
  for a virtual compute instance that is identified for migration from a source host to a destination host and is a client of a network-based storage resource that stores data for which access is enforced according to a lease state for hosts connected to the network-based resource:
    direct the destination host to establish a connection with the network-based storage resource with a standby lease state; and
    direct that a request be sent to the network-based storage resource to promote the standby lease state for the destination host to a primary lease state and to change a primary lease state for the source host to another lease state.

2. The system of claim 1, wherein the control plane is configured to resume operation of the virtual compute instance at the destination host.

3. The system of claim 2, wherein the network-based storage resource partitions the data for the virtual compute instance amongst a plurality of partition hosts, and wherein the destination host is directed to establish the connection with the standby lease with the plurality of partition hosts, and wherein the request is sent to the plurality of partition hosts.

4. The system of claim 2, wherein the destination host is configured to determine a resume point for resuming operation of the virtual compute instance at the destination host based on communication with the source host.

5. The system of claim 1, wherein to change the primary lease state for the source host to the other lease state, the control plane is configured to demote the primary lease state for the source host to a deactivated lease state.

6. The system of claim 2, wherein the destination host is configured to acknowledge to the control plane success of a flip operation performed in response to the request.

7. The system of claim 6, wherein the control plane is configured to:
in response to receiving acknowledgment from the destination host of the success of the flip operation, reclaim resources at the source host that are no longer needed to host the virtual compute instance.

8. A method, comprising:
performing, by one or more computing devices:
  for a virtual compute instance that is identified for migration from a source host to a destination host and is a client of a network-based storage resource that stores data for which access is enforced according to a lease state for hosts connected to the network-based resource:
    establishing a connection between the destination host and the network-based storage resource with a standby lease state; and
    sending a request to the network-based storage resource to promote the standby lease state for the destination host to a primary lease state and to change a primary lease state for the source host to another lease state.

9. The method of claim 8, further comprising resuming operation of the virtual compute instance at the destination host.

10. The method of claim 9, wherein the network-based storage resource partitions the data for the virtual compute instance amongst a plurality of partition hosts, and wherein the connection with the standby lease is established between the destination host and the plurality of partition hosts, and wherein the request is sent to the plurality of partition hosts.

11. The method of claim 9, further comprising:
acknowledging, by the destination host to the control plane, success of a flip operation performed in response to the request; and in response to receiving acknowledgment from the destination host of the success of the flip operation, reclaiming resources at the source host that are no longer needed to host the virtual compute instance.

12. The method of claim 8, wherein changing the primary lease state for the source host to the other lease state comprises demoting the primary lease state for the source host to a deactivated lease state.

13. The method of claim 8, wherein the virtual compute instance is hosted as part of a virtual computing service of a provider network, wherein the network based storage resource is a virtual block-based data volume implemented as part of a virtual block-based storage service of the provider network.

14. A non-transitory, computer-readable storage medium, storing program instructions that when executed by one or more computing devices cause the one or more computing devices to implement:

for a virtual compute instance that is identified for migration from a source host to a destination host and is a client of a network-based storage resource that stores data for which access is enforced according to a lease state for hosts connected to the network-based resource:

establishing a connection between the destination host and the network-based storage resource with a standby lease state; and sending a request to the network-based storage resource to promote the standby lease state for the destination host to a primary lease state and to change a primary lease state for the source host to another lease state.

15. The non-transitory, computer-readable storage medium of claim 14, wherein the program instructions cause the one or more computing devices to implement resuming operation of the virtual compute instance at the destination host.

16. The non-transitory, computer-readable storage medium of claim 15, wherein the network-based storage resource partitions the data for the virtual compute instance amongst a plurality of partition hosts, and wherein the connection with the standby lease is established between the destination host and the plurality of partition hosts, and wherein the request is sent to the plurality of partition hosts.

17. The non-transitory, computer-readable storage medium of claim 15, wherein the program instructions cause the one or more computing devices to implement determining a resume point for resuming operation of the virtual compute instance at the destination host based on communication with the source host.

18. The non-transitory, computer-readable storage medium of claim 15, wherein the program instructions cause the one or more computing devices to implement acknowledging, by the destination host to the control plane, success of a flip operation performed in response to the request.

19. The non-transitory, computer-readable storage medium of claim 14, wherein to change the primary lease state for the source host to the other lease state, the program instructions cause the one or more computing devices to implement demoting the primary lease state for the source host to a deactivated lease state.

20. The non-transitory, computer-readable storage medium of claim 18, wherein the program instructions cause the one or more computing devices to implement in response to receiving acknowledgment from the destination host of the success of the flip operation, reclaiming resources at the source host that are no longer needed to host the virtual compute instance.

* * * * *